United States Patent
Lev et al.

(10) Patent No.: US 9,466,822 B2
(45) Date of Patent: *Oct. 11, 2016

(54) BATTERY MODULE WITH A FLEXIBLE BUS

(71) Applicant: GM Global Technology Operations LLC, Detroit, MI (US)

(72) Inventors: Leonid C. Lev, West Bloomfield, MI (US); Nikolay Kondratyev, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 25 days.

This patent is subject to a terminal disclaimer.

(21) Appl. No.: 14/870,291

(22) Filed: Sep. 30, 2015

(65) Prior Publication Data

US 2016/0020451 A1 Jan. 21, 2016

Related U.S. Application Data

(63) Continuation of application No. 13/396,725, filed on Feb. 15, 2012, now Pat. No. 9,178,203.

(51) Int. Cl.
*H02J 7/00* (2006.01)
*H01M 2/20* (2006.01)
*H01M 10/42* (2006.01)
*H01M 10/48* (2006.01)

(52) U.S. Cl.
CPC ............ *H01M 2/206* (2013.01); *H01M 2/202* (2013.01); *H01M 10/425* (2013.01); *H01M 10/482* (2013.01); *H01M 2010/4271* (2013.01); *H01M 2010/4278* (2013.01); *H01M 2220/20* (2013.01); *H02J 7/0011* (2013.01)

(58) Field of Classification Search
USPC ......................................................... 320/110
See application file for complete search history.

(56) References Cited

U.S. PATENT DOCUMENTS

| | | | | |
|---|---|---|---|---|
| 5,582,931 A | * | 12/1996 | Kawakami | H01M 6/40 429/127 |
| 6,773,848 B1 | * | 8/2004 | Nortoft | H01M 2/1066 361/776 |
| 6,972,544 B2 | * | 12/2005 | Seman, Jr. | H01M 2/204 320/112 |
| 7,033,701 B2 | * | 4/2006 | Hong | H01M 2/18 429/129 |

* cited by examiner

Primary Examiner — Richard Isla Rodas
Assistant Examiner — David V Henze-Gongola
(74) Attorney, Agent, or Firm — Fraser Clemens Martin & Miller LLC; William A. Ziehler

(57) ABSTRACT

A battery module includes a plurality of battery cells and a flexible bus. Each of the battery cells has a main body, a first terminal disposed on the main body, and a second terminal disposed on the main body. The main body includes active material configured to generate power from an electrochemical reaction. The bus includes an electrical current harness configured to conduct an electrical current through the battery module and a battery management system configured to detect and transmit status information, as well as selectively control a charging and a discharging of at least one of the battery cells.

20 Claims, 2 Drawing Sheets

BATTERY MODULE WITH A FLEXIBLE BUS

CROSS-REFERENCE TO RELATED APPLICATIONS

Figure 1:
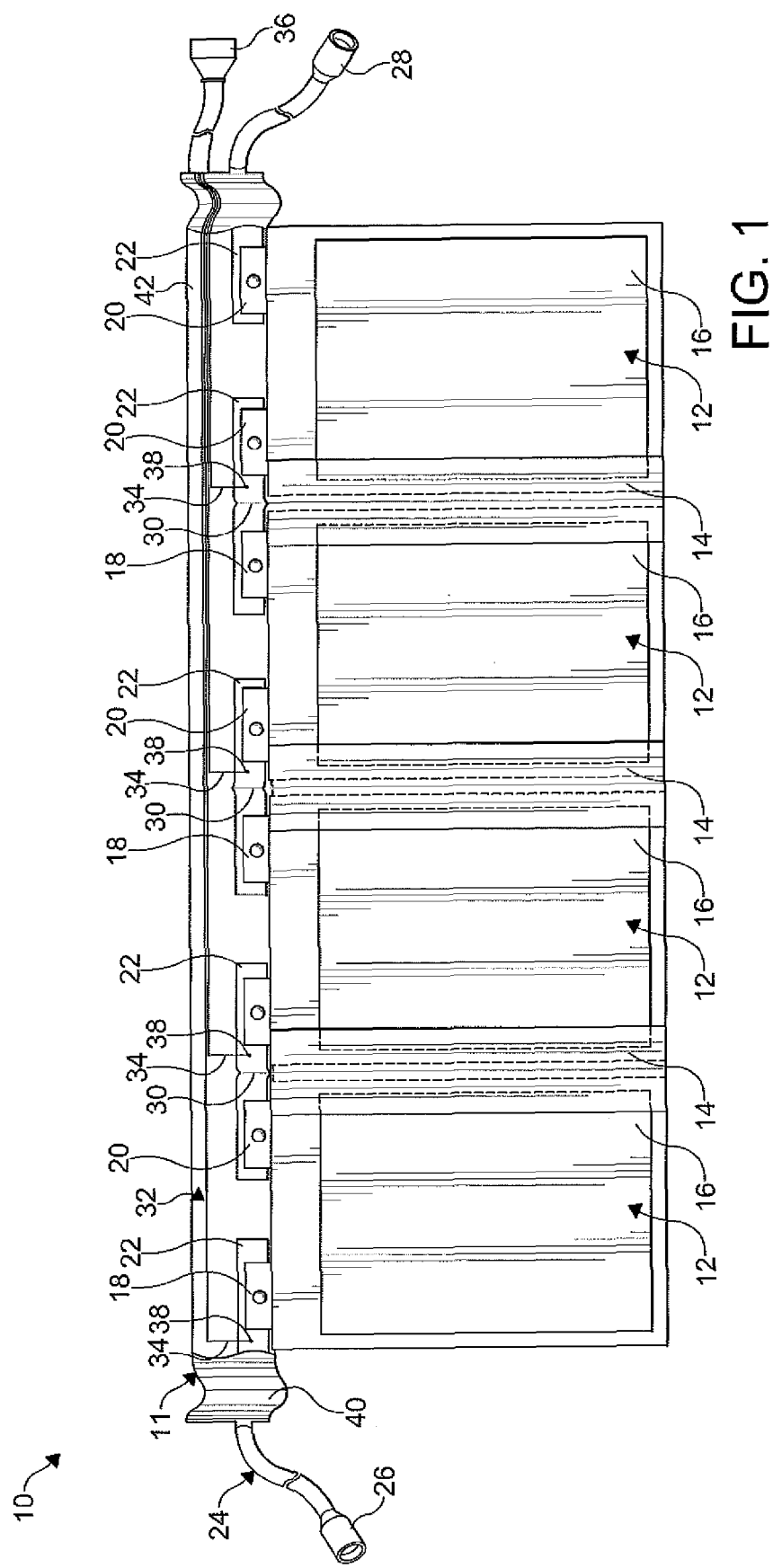

This application is a continuation of U.S. application Ser. No. 13/396,725, filed on Feb. 15, 2012. The entire disclosure of the above application is incorporated herein by reference.

FIELD OF THE INVENTION

The present disclosure relates to a battery pack and more particularly to a flexible bus for the battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be in the form of a prismatic pouch.

A plurality of the battery cells can be provided in a battery pack to provide an amount of power sufficient to operate electric vehicles. Typically, the battery cells are selectively interconnected in series or parallel through use of an interconnect board. The interconnect board is oftentimes is integrated into an enclosure of the battery pack, resulting in exposure to environmental conditions. In addition, because the interconnect board is configured to be integrated into the enclosure of the battery pack, a different bus is required for each battery pack design. Fuses and various electrical and electromechanical devices such as bypass, equalization, and communication devices, for example, may also be mounted to the interconnect board. The many different electrical interfaces along the bus can result in power losses due to electrical resistance at the individual connections. The large number of electrical interfaces along the bus also increases a likelihood of undesirable battery pack performance, and contributes to a manufacturing complexity of the known battery pack.

There is a continuing need for a battery module with a flexible bus that permits an electrical connection of battery cells with a minimal number of components, minimizes mass, and which minimizes manufacturing complexity by using a single bus for multiple battery pack designs.

SUMMARY OF THE INVENTION

In concordance with the instant disclosure, a battery module with a flexible bus that permits an electrical connection of battery cells with a minimal number of components, minimizes mass, and which minimizes manufacturing complexity by using a single bus for multiple battery pack designs, is surprisingly discovered.

In an embodiment, a flexible bus for use in a battery pack, comprises: an electrical current harness configured to conduct an electrical current, wherein the electrical current harness includes at least one flexible bus bar to electrically connect a plurality of battery cells, each of the battery cells including an active material configured to generate power from an electrochemical reaction; and a battery management system configured to detect and transmit status information of at least one of the battery cells.

In another embodiment, a battery module, comprises: a first battery cell having a main body including an active material configured to generate power from an electrochemical reaction and a first terminal disposed on the main body; a second battery cell disposed adjacent the first battery cell, the second battery cell having a main body including an active material configured to generate power from an electrochemical reaction, and a second terminal disposed on the main body; and a flexible bus including an electrical current harness configured to conduct an electrical current through the battery module, the electrical current harness including a flexible bus bar to electrically connect the first terminal of the first battery cell with the second terminal of the second battery cell.

In yet another embodiment, a battery module, comprises: a plurality of battery cells, each of the battery cells including a main body having a first terminal and a second terminal disposed thereon, the main body including an active material configured to generate power from an electrochemical reaction; and a flexible bus coupled to the battery cells, the bus including an electrical current harness configured to conduct an electrical current through the battery module and a battery management system configured to detect and transmit status information of at least one of the battery cells, wherein the electrical current harness is formed by a first main terminal, a second main terminal, and a plurality of flexible bus bars electrically connected to the battery cells, each of the bus bars electrically connects the first terminal of one of the battery cells with the second terminal of an adjacent one of the battery cells.

DRAWINGS

The above, as well as other advantages of the present disclosure, will become readily apparent to those skilled in the art from the following detailed description, particularly when considered in the light of the drawings described herein.

Figure 2:
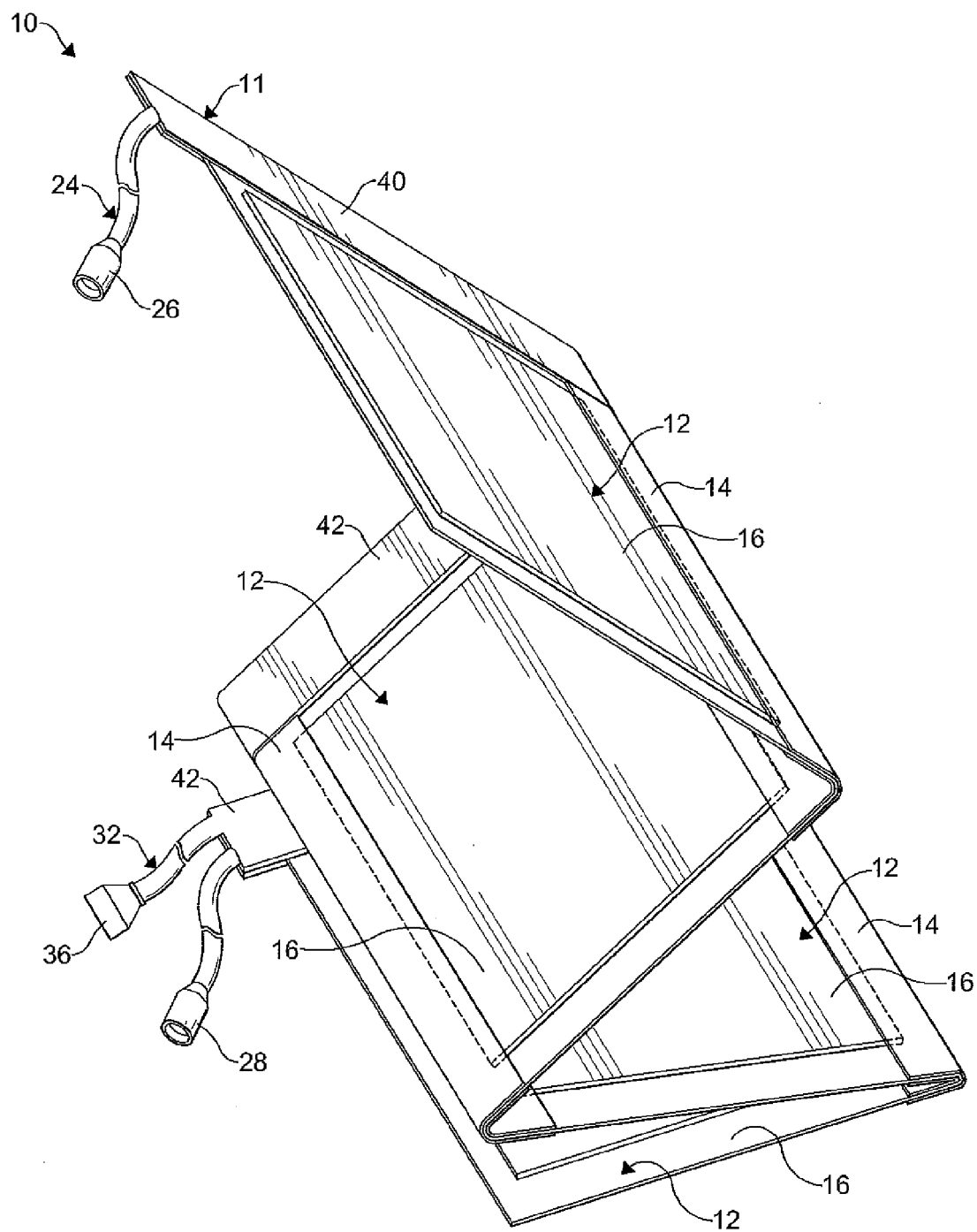

FIG. 1 is a fragmentary, front elevational view of a battery module provided with a flexible bus according to one embodiment of the present disclosure, with four battery cells shown in electrical communication; and FIG. 2 is a bottom perspective view of the battery module illustrated in FIG. 1, with four battery cells shown in electrical communication and in a partially folded position.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

With reference to FIGS. 1-2, a battery module 10 with a flexible bus 11 according to one embodiment of the present disclosure is shown. It is contemplated in the present disclosure that the flexible bus 11 can be used with any battery module 10 and battery pack design as desired. The battery module 10 includes a plurality of battery cells 12. Adjacent ones of the battery cells 12 are coupled together by a hinge 14. As a non-limiting example, the hinge 14 is a living hinge formed by a flexible material disposed along opposing edges of the adjacent ones of the battery cells 12 on opposite sides of the battery cells 12. Depending on the needs of a given application, the battery cells 12 may be connected in series or parallel. In applications that require a higher voltage, the battery cells 12 may be connected in series, whereas in applications that require a lower voltage, the battery cells 12 may be connected in parallel.

The battery cells 12 shown are prismatic pouch battery cells. As a nonlimiting example, the battery cells 12 may be a prismatic pouch lithium-ion (Li-ion) battery cell. It should be appreciated that other battery cells 12, employing a different structure and a different electrochemistry, may also be used within the scope of the present invention. Although only four battery cells 12 are shown in FIGS. 1-2, it should be understood that additional like battery cells 12 may be disposed in a linear array to form the battery module 10 of the present disclosure.

Each of the battery cells 12 has a main body 16 with an active material configured to generate power from an electrochemical reaction. The battery cells 12 each also include a first terminal 18 and a second terminal 20. As shown, the terminals 18, 20 extend laterally outwardly from an end of the main body 16 of the battery cells 12. It is understood that the terminals 18, 20 can extend from other locations of the main body 16, as well as be folded over on top of a major surface of the main body 16. The first terminal 18 may be positive and the second terminal 20 may be negative, or vice-versa, as desired. The terminals 18, 20 are typically in electrical communication with the main body 16. However, a skilled artisan should understand that at least one of the terminals 18, 20 may be electrically insulated from the main body 16, for example, with a polymeric spacer or the like. As a non-limiting example, the terminals 18, 20 are formed from at least one electrically conductive material such as copper, aluminum, nickel, zinc, and tin, for example.

The bus 11 is a configured to place the first terminals 18 of the battery cells 12 in electrical communication with the second terminal 20 of adjacent battery cells 12. In particular, bus bars or jumpers 22 of the bus 11 connect the first terminals 18 of one of the battery cells 12 to the second terminals 20 of an adjacent one of the battery cells 12 forming an electrical current harness 24. One of the bus bars 22 connected to the first terminals 18 is in electrical communication with a first main terminal 26 of the bus 11. One of the bus bars 22 connected to the second terminals 20 is in electrical communication with a second main terminal 28. The first main terminal 26 may be positive and the second main terminal 28 may be negative, or vice-versa, as desired. The bus bars 22 conduct electrical current between the battery cells 12. In the illustrated embodiment, the bus bar 22 is welded to the terminals 18, 20, for example, by ultrasonic welding. Other methods for affixing the bus bars 22 to the first terminal 18 of the one of the battery cells 12 and the second terminal 20 of the adjacent one of the battery cells 12 may also be employed within the scope of the present disclosure such as crimping, soldering, or other suitable means of connection imparting minimal resistance, for example. The flexible bus bars 22 may be formed from at least one of aluminum and copper, as particular non-limiting examples. A skilled artisan may select other suitably flexible electrically conductive materials, as desired. A hinge 30 can be formed in the bus bars 22 prior to connection to the terminals 18, 20 to control where and a direction in which the bus bars 22 flex or bend during a manufacture of the battery module 10. As a non-limiting example, the hinge 30 is a preformed crease.

The bus 11 of the present disclosure includes a battery management system 32 configured to detect and transmit status information of at least one of the battery cells 12. The battery management system 32 may transmit the status information detected to a microprocessor (not shown). In the illustrated embodiment, individual traces 34 (i.e. signal lines) are connected to each of the bus bars 22 and a common connector 36. As a non-limiting example, an end 38 of the individual traces 34 is connected to the respective bus bar 22 by a weld. Other means of affixing the ends 38 of the traces 34 to the bus bars 22 can be employed such as soldering, for example. Each of the traces 34 is configured to carry an electrical signal associated with at least one parameter of the battery cells 12 to be measured or monitored. For example, a voltage and a temperature of at least one of the battery cells 12 or the battery module 10 can be detected by a resistive thermal device of the battery management system 32 and transmitted by the bus 11. Since the traces 34 shown are connected to each of the battery cells 12 in parallel, the bus 11 can also be used to selectively control a charging and a discharging of each of the battery cells 12.

A flexible covering 40 substantially encloses the battery management system 32 and the electrical current harness 24 to provide protection from exposure to environmental elements and conditions. The covering 40 can also be configured to substantially separate the battery management system 32 from the electrical current harness 24. Other means of substantially enclosing the battery management system 32 and the electrical current harness 24 and substantially separating the battery management system 32 from the electrical current harness 24 can be employed as desired.

In the illustrated embodiment, the covering 40 has a thickness that facilitates a bending or folding of the bus 11 and the battery cells 12. It is understood that the covering 40 can be any shape, size, and thickness, and formed from any suitable material as desired such as an expandable, heat resistant material, for example. As a nonlimiting example, the covering 40 is formed from at least one flexible non-conductive substrate 42 disposed on opposite sides of the battery management system 32 and the electrical current harness 24.

The covering 40 can also be configured to substantially enclose the battery management system 32 and the electrical current harness 24 of the bus 11, and the terminals 18, 20 and the main body 16 of the battery cells 12 to provide protection from exposure to environmental elements and conditions. For example, the covering 40 can be formed from at least one flexible non-conductive substrate 42 disposed on opposite sides of the battery management system 32 and the electrical current harness 24 which extends over at least a portion of the terminals 18, 20 and/or at least a portion of the main body 16 of the battery cells 12. In certain embodiments, the covering 40 is configured to sealingly enclose the entire battery module 10 having only the main terminals 26, 28 and the common connector 36 extending therefrom. As such, the covering 40 provides protection to substantially the entire battery module 10 from exposure to environmental elements and conditions. In addition, the covering 40 can also be used to capture gasses generated by the battery cells 12. It is understood that other means of substantially enclosing the bus 11 and the battery cells 12 of the battery module 10 can be employed if desired.

It is further contemplated in the present disclosure that the covering 40 may include at least a portion of at least one of the battery management system 32 and the electrical current harness 24 substantially integrated therewith if desired. For example, at least one of the resistive thermal devices of the battery management system 32 can be integrated into the at least one flexible non-conductive substrate 42 of the covering 40 if desired.

Where the bus 11 of the present disclosure is employed, it should be appreciated that during manufacture of the battery module 10, each of the bus bars 22 is flexed or bent in a desired direction when the battery cells 12 are disposed in a stacked array within the battery module 10. For example, as shown in FIG. 2, one the battery cells 12 including the bus 11 is folded in a first direction, and the adjacent one of the battery cells 12 including the bus 11 is folded in a second direction different from the first direction, with subsequent ones of the battery cells 12 alternating in a like manner to manufacture the battery module 10. As such, the battery cells 12 are folded over each other such that a face of one of the battery cells 12 abuts an opposite face of an adjacent one of the battery cells 12. It is understood, however, that a cooling system (not shown) and/or spacers (not shown) may be interleaved between the battery cells 12 of the battery module 10 to maintain the temperature of the battery module 10 within a desired range. Once each of the battery cells 12 has been folded, the completed battery module 10 may be disposed within a frame (not shown) for assembly into a battery pack (not shown).

Advantageously, the bus 11 of the present disclosure facilitates assembly of the battery module 10 with fewer components, as well as permits an electrical connection of the battery cells 12 with a minimal number of components, minimizes mass, and minimizes manufacturing complexity and cost by using a single bus for multiple battery pack designs.

While certain representative embodiments and details have been shown for purposes of illustrating the invention, it will be apparent to those skilled in the art that various changes may be made without departing from the scope of the disclosure, which is further described in the following appended claims.

What is claimed is:

1. A battery module with a flexible bus, the battery module having a plurality of battery cells, the flexible bus comprising:
    an electrical current harness configured to conduct an electrical current, the electrical current harness including a plurality of flexible bus bars to electrically connect the plurality of battery cells, the plurality of flexible bus bars including a first plurality of flexible bus bars configured to fold in a first direction and a second plurality of flexible bus bars configured to fold in a second direction, each flexible bus bar including a hinge configured to fold about 180 degrees, the hinges of adjacent flexible bus bars configured to fold in opposite directions, wherein each of the flexible bus bars is disposed along only one edge of the flexible bus; and
    a battery management system configured to detect and transmit status information of at least one of the battery cells.

2. The flexible bus of claim 1, wherein the electrical current harness further includes a first main terminal and a second main terminal.

3. The flexible bus of claim 1, further comprising a covering enclosing the electrical current harness and the battery management system.

4. The flexible bus of claim 3, wherein the covering substantially separates the electrical current harness and the battery management system.

5. The flexible bus of claim 3, wherein the covering is formed from at least one flexible nonconductive substrate disposed on opposite sides of the battery management system and the electrical current harness.

6. The flexible bus of claim 1, wherein the flexible bus is configured to connect the plurality of battery cells in series.

7. The flexible bus of claim 1, wherein the hinge includes a preformed crease.

8. The flexible bus of claim 1, wherein the battery management system includes at least one trace configured to be electrically connected to at least one of the battery cells, the at least one trace configured to carry an electrical signal associated with at least one parameter of the battery cells.

9. The flexible bus of claim 8, wherein the at least one trace is configured to carry an electrical signal associated with a voltage of at least one of the battery cells.

10. The flexible bus of claim 8, wherein the at least one trace is configured to carry an electrical signal associated with a temperature of at least one of the battery cells.

11. The flexible bus of claim 1, wherein the battery management system includes a plurality of traces configured to be electrically connected in parallel to the plurality of battery cells.

12. The flexible bus of claim 1, wherein the battery management system is configured to selectively control a charging and a discharging of at least one of the battery cells.

13. The flexible bus of claim 1, wherein the battery management system includes a resistive thermal device that is integrated into a covering enclosing the electrical current harness and the battery management system.

14. The flexible bus of claim 1, wherein the flexible bus is configured to have each flexible bus bar electrically connect a first terminal of one of the battery cells to a second terminal of an adjacent one of the battery cells forming an electrical current harness.

15. The flexible bus of claim 1, wherein the flexible bus is configured to be coextensive with only one edge of the plurality of battery cells when the plurality of flexible bus bars is electrically connected to the plurality of battery cells.

16. The flexible bus of claim 1, wherein the flexible bus is configured to have the plurality of flexible bus bars electrically connected with the plurality of battery cells, the plurality of battery cells disposed in a linear array.

17. The flexible bus of claim 1, wherein the flexible bus is configured to be coplanar with the plurality of battery cells when the plurality of flexible bus bars is electrically connected to the plurality of battery cells, a separate portion of the flexible bus coplanar with each battery cell when each flexible bus bar is folded at each hinge.

18. The flexible bus of claim 1, wherein the plurality of battery cells includes at least four battery cells.

19. A battery module with a flexible bus, the battery module having a plurality of battery cells, the flexible bus comprising:
    an electrical current harness configured to conduct an electrical current, the electrical current harness including a plurality of flexible bus bars to electrically connect the plurality of battery cells, the plurality of flexible bus bars including a first plurality of flexible bus bars configured to fold in a first direction and a second plurality of flexible bus bars configured to fold in a second direction, each flexible bus bar including a hinge configured to fold about 180 degrees, the hinges of adjacent flexible bus bars configured to fold in opposite directions, wherein each of the flexible bus bars is disposed along only one edge of the flexible bus; and
    a battery management system configured to detect and transmit status information of at least one of the battery cells, wherein the battery management system includes a plurality of traces configured to be electrically connected in parallel to the plurality of battery cells.

20. A battery module with a flexible bus, the battery module having a plurality of battery cells disposed in a linear array, the flexible bus comprising:
  an electrical current harness configured to conduct an electrical current, the electrical current harness including a plurality of flexible bus bars to electrically connect the plurality of battery cells disposed in a linear array, the plurality of flexible bus bars including a first plurality of flexible bus bars configured to fold in a first direction and a second plurality of flexible bus bars configured to fold in a second direction, each flexible bus bar including a hinge configured to fold about 180 degrees, the hinges of adjacent flexible bus bars configured to fold in opposite directions, wherein each of the flexible bus bars is disposed along only one edge of the flexible bus; and
  a battery management system configured to detect and transmit status information of at least one of the battery cells.

* * * * *